(12) United States Patent
Sawamura et al.

(10) Patent No.: US 6,692,691 B2
(45) Date of Patent: Feb. 17, 2004

(54) PB-FREE SOLDERING ALLOY

(75) Inventors: Tadashi Sawamura, Tokyo (JP); Hisashi Komiya, Tokyo (JP); Tsuguo Inazawa, Osaka (JP); Fujio Nakagawa, Osaka (JP)

(73) Assignees: Nihon Alimit Co., Ltd., Tokyo (JP); Matsushita Electric Industrial Co., Ltd., Osaka (JP)

( * ) Notice: Subject to any disclaimer, the term of this patent is extended or adjusted under 35 U.S.C. 154(b) by 20 days.

(21) Appl. No.: 09/893,894

(22) Filed: Jun. 29, 2001

(65) Prior Publication Data

US 2002/0015659 A1 Feb. 7, 2002

(30) Foreign Application Priority Data

Jun. 30, 2000 (JP) .......................................... 2000-199074

(51) Int. Cl.$^7$ ............................. C22C 13/00; B23K 1/00
(52) U.S. Cl. ....................... 420/557; 148/400; 420/560; 420/561; 420/562
(58) Field of Search ......................... 148/400; 420/557, 420/560, 561, 562

(56) References Cited

U.S. PATENT DOCUMENTS 5,863,493 A * 1/1999 Achari et al. ............... 420/557
6,231,691 B1 * 5/2001 Anderson et al. ........... 148/400
6,365,097 B1 * 4/2002 Yamashita et al. .......... 420/561

FOREIGN PATENT DOCUMENTS

| JP | 06269983 | * | 9/1994 |
| JP | 08001373 | * | 1/1996 |
| JP | 8001373 | * | 1/1996 |
| JP | 10-13015 | | 1/1998 |
| JP | 10034376 | * | 2/1998 |
| JP | 10144718 | * | 5/1998 |
| JP | 11-277290 | | 10/1999 |

* cited by examiner

*Primary Examiner*—Sikyin Ip
(74) *Attorney, Agent, or Firm*—McDermott, Will & Emery

(57) ABSTRACT

A Pb-free soldering alloy that does not include any Pb is provided. The soldering alloy prevents Cu present in a printed-circuit board from combining with Ni in the soldering alloy at the soldered part, prevents Cu from precipitating and diffusing in the soldering alloy, suppresses the generation of fine cracks at the soldered part and increases the mechanical strength of the soldered part. The Pb-free soldering alloy contains 3.5 to 6.0 wt. % Ag, 0.001 to 1.0 wt. % Ni and Sn for the balance.

2 Claims, No Drawings

PB-FREE SOLDERING ALLOY

TECHNICAL FIELD

The present invention relates to Pb-free soldering alloy that does not include any amount of Pb.

BACKGROUND ART

In the past, some Japanese patent publication laid-open such as Japanese patent publication laid-open 10-13015 and Japanese patent publication laid-open 11-277290 disclosed Pb-free soldering alloy comprising Ag, Ni and Sn and not including any amount of Pb.

The above-mentioned Japanese patent publication laid-open 10-13015 disclosed Pb-free soldering alloy comprising Ag, Ni and Sn and not including any amount of Pb but did not disclose their concrete contents.

On the other hand, the above-mentioned Japanese patent publication laid-open 11-277290 disclosed Pb-free soldering alloy comprising Ni of 0.01 to 0.5 wt. %, Ag of 0.5 to 3.39 wt. % and Sn of the balance. However, Ag of 0.5 to 3.39 wt. % was comparatively low amount and Sn was comparatively high amount to the contrary. Thus, there was a problem that much amount of Cu comprised in a printed-circuit board to be jointed by soldering was reduced to be diffused in the soldering alloy whereby resulting in lowering the mechanical strength of the jointed part of the printed-circuit board.

Furthermore, in case the amount of Ag to be added was less than 3.5% relative to the amount of Sn, the excessive amount of Sn precipitated as β-Sn at the soldered part and fine cracks by the shrinkage cavity occurred on the upper layer of the soldered part during solidification.

Thus, the purpose of the present invention is to propose Pb-free soldering alloy which does not include any amount of Pb, which prevents much of the Cu contained in the printed-circuit board from being reduced to be diffused in the soldering alloy and fine cracks from occurring at the soldered part by combining Cu contained in the printed-circuit board with Ni contained in the soldering alloy and which in addition provides high mechanical strength at the soldered part.

DISCLOSURE OF INVENTION

Pb-free soldering alloy according to one aspect of the invention is characterized in that it comprises Ag of 3.5 to 6.0 wt. %, Ni of 0.001 to 1.0 wt. % and Sn of the balance.

Pb-free soldering alloy according to a second aspect of the invention includes further one or more of P, Ga and Ge of 0.001 to 1.0 wt. %.

According to the first aspect of the invention, Cu comprised in the printed-circuit board is prevented from being diffused in the soldering alloy by adding Ni to Sn—Ag soldering alloy. Thus, in case of soldering a Cu fine line such as a lead, less amount of Cu is precipitated from the Cu fine line to the soldering alloy. As a result, the prevention of the reduction of Cu from the Cu fine line and the suppression of the reduction of its diameter can maintain mechanical strength of the lead.

In addition, as Ni is diffused in the soldering alloy, the mechanical strength of the soldering alloy itself can be kept advantageously.

Even when an electronic part and a printed-circuit board are soldered by conventional Sn—Pb soldering alloy, Cu is precipitated from a Cu foil of the printed-circuit board and is diffused in the soldering alloy.

However, in case soldering alloy including Pb can not be used by reason that Pb causes an environmental problem and Pb-free soldering alloy including Sn principally is used instead, more amount of Cu is precipitated than in Sn—Pb soldering alloy and diffused in the soldering alloy because the more amount of Sn is included in the soldering alloy, the more easily Cu is precipitated and diffused in the soldering alloy. Thus, the Pb-rich soldering alloy has been used inevitably to prevent much amount of Cu from being precipitated and diffused in the soldering alloy.

From the above-mentioned reason, Sn—Ag—Cu soldering alloy and Sn—Ag—Cu—Bi soldering alloy reduce the mechanical strength of a lead to be soldered because the principal constituent of them is Sn and they cause the precipitation and the diffusion of more amount of Cu than the conventional type soldering alloy.

According to the present invention, as the amount of Ag included in the soldering is 3.0 to 6.0 wt. % which is more than in the conventional type, the amount of β-Sn in the soldering alloy is less. Owing to the multiplicative effects of the presence of fine $Ag_3Sn$ and the diffusion of Ni, the mechanical strength of the soldered joint is raised.

In addition, We found that the addition of Ni prevented Cu of the Cu foil on the printed-circuit board from being precipitated and diffused in the soldering alloy.

According to the second aspect of the invention, as any one or more of P, Ga and Ge is or are added to the soldering alloy by 0.001 to 1 wt. %, the oxidation of the soldering alloy during soldering is reduced, the generation of dross is suppressed and good soldering capability is given.

BEST MODE FOR CARRYING OUT THE INVENTION

We explain the present invention showing some Examples below.

As shown in table 1, in Example 1, the melting point of Pb-free soldering alloy comprising Ni of 0.01 wt. %, P of 0.05 wt. %, Ag of 3.8 wt. % and the rest Sn of 96.14 wt. % was 225° C.

In Example 2, that of Pb-free soldering alloy comprising Ni of 0.05 wt. %, Ga of 0.05 wt. %, Ag of 3.8 wt. % and the rest Sn of 96.1 wt. % was 225° C.

In Example 3, that of Pb-free soldering alloy comprising Ni of 0.1 wt. %, Ge of 0.05 wt. %, Ag of 4.0 wt. % and the rest Sn of 95.85 wt. % was 227° C.

In Example 4, that of Pb-free soldering alloy comprising Ni of 0.3 wt. %, P of 0.07 wt. %, Ga of 0.03 wt. %, Ag of 4.0 wt. % and the rest Sn of 95.6 wt. % was 290° C.

In Example 5, that of Pb-free soldering alloy comprising Ni of 0.5 wt. %, Ga of 0.05 wt. %, Ge of 0.05 wt. %, Ag of 4.0% and the rest Sn of 95.4 wt. % was 356° C.

In Example 6, that of Pb-free soldering alloy comprising Ni of 1.0 wt. %, P of 0.03 wt. %, Ge of 0.07 wt. %, Ag of 4.5 wt. % and the rest Sn of 94.4 wt. % was 420° C.

In Comparative Example 1, that of Pb-free soldering alloy comprising Ni of 0.05 wt. %, Ag of 2.5 wt. % and the rest Sn of 97.45 wt. % was 224° C.

In Comparative Example 2, that of Pb-free soldering alloy comprising Ni of 0.1 wt. %, Ag of 3.3 wt. % and the rest Sn of 96.6 wt. % was 223° C.

In Comparative Example 3, that of Pb-free soldering alloy comprising Ag of 3.5 wt. % and the rest Sn of 96.5 wt. % was 221° C.

Using these types, we soldered Cu lines for 2 seconds at 350° C. and 400° C. respectively and examined the reduction of Cu amount at the soldered part of Cu lines. As the result, we found that by using Ni-added soldering alloy we could suppress the precipitation of Cu of Cu lines and its diffusion in the soldering alloy.

TABLE 1

Cu reduction test results

| | Sn wt. % | Ag wt. % | Ni wt. % | P wt. % | Ga wt. % | Ge wt. % | Solid phase line °C. | liquid phase line °C. | Section reduction ratio % | |
|---|---|---|---|---|---|---|---|---|---|---|
| | | | | | | | | | 350° C. × 2 seconds | 400° C. × 2 seconds |
| Example 1 | 96.14 | 3.8 | 0.01 | 0.05 | | | 221 | 225 | 91.7 | 84.6 |
| Example 2 | 96.10 | 3.8 | 0.05 | | 0.05 | | 221 | 225 | 92.9 | 84.9 |
| Example 3 | 95.85 | 4.0 | 0.10 | | | 0.05 | 221 | 227 | 93.3 | 85.2 |
| Example 4 | 95.60 | 4.0 | 0.30 | 0.07 | 0.03 | | 221 | 290 | 93.8 | 86.1 |
| Example 5 | 95.40 | 4.0 | 0.50 | | 0.05 | 0.05 | 221 | 356 | 94.8 | 90.1 |
| Example 6 | 94.40 | 4.5 | 1.00 | 0.03 | | 0.07 | 221 | 420 | 96.7 | 91.9 |
| Comparative Example 1 | 97.45 | 2.5 | 0.05 | | | | 221 | 224 | 85.5 | 78.2 |
| Comparative Example 2 | 96.60 | 3.3 | 0.10 | | | | 221 | 223 | 87.6 | 79.6 |
| Comparative Example 3 | 96.50 | 3.5 | 0 | | | | 221 | 221 | 86.1 | 80.2 |
| Cu line before soldering | | | | | | | | | 100 supposed | |

Furthermore, in order to examine the mechanical strength at the soldered part, we inserted a square-sectioned pin in 1.2mm×1.2 mm made of brass coated with Sn into a hole of 1.8 mm in diameter of a Cu-patterned printed-circuit board whose land circumference was 3.0 mm and soldered them. In this case, the soldering alloy was 30 mg in weight and we prepared the test piece using liquid flux and a soldering iron for soldering. The temperatures of the iron tip for the tests were 350° C. and 400° C. and the soldering time was 2 seconds in both the cases.

We pulled off the pin from the test piece at 10 mm/min in tension speed using a tension tester and measured the tension load required for pulling it off. We measured it five times for the same test piece and calculated the mean value of the measured ones to show it in a table. In addition, in order to measure the weight of the generated dross, we jetted soldering alloy in a jet solder tank for 8 hours and took out the generated dross to measure its weight on a balance. Table 2 shows the total weight of the dross jetted for 8 hours and its average weight per hour.

TABLE 2

Results of tension tests and dross generation tests

| | tension test ($\times 10^2$N) | | weight of generated dross per 100 kg | |
|---|---|---|---|---|
| | 350° C. × 2 seconds | 400° C. × 2 seconds | total weight for 8 hrs | average weight per 1 hr |
| Example 1 | 3.3 | 3.1 | 2.43 kg | 0.30 kg |
| Example 2 | 3.4 | 3.1 | 2.44 kg | 0.31 kg |
| Example 3 | 3.7 | 3.2 | 2.41 kg | 0.30 kg |
| Example 4 | 3.9 | 3.2 | 2.35 kg | 0.29 kg |
| Example 5 | 4.0 | 3.3 | 2.22 kg | 0.28 kg |
| Example 6 | 4.4 | 3.6 | 2.11 kg | 0.27 kg |
| Comparative Example 1 | 3.0 | 2.8 | 4.35 kg | 0.54 kg |
| Comparative Example 2 | 3.2 | 3.0 | 4.25 kg | 0.53 kg |
| Comparative Example 3 | 3.2 | 2.9 | 4.18 kg | 0.52 kg |

What is claimed is:

1. A Pb-free soldering alloy consisting essentially of Ag of 3.5 to 6.0 wt. %, Ni of 0.001 to 1.0 wt. % and Sn of the balance.

2. A Pb-free soldering alloy consisting essentially of Ag of 3.5 to 6.0 wt. %, Ni of 0.001 to 1.0 wt. %, 0.001 to 1.0 wt. % of one or more of P, Ga and Ge and a balance of Sn.

* * * * *